(12) United States Patent
Kumar et al.

(10) Patent No.: US 10,366,315 B1
(45) Date of Patent: Jul. 30, 2019

(54) GENERATING A QUICK RESPONSE (QR) GRID ASSOCIATED WITH A DIGITAL DOCUMENT

(71) Applicant: FMR LLC, Boston, MA (US)

(72) Inventors: Sai Kumar, Chittoor District (IN); Ramanathan Ramamoorthy, Tuticorin district (IN); Giri Venkataramanan, Chennai (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 16/103,950

(22) Filed: Aug. 15, 2018

(51) Int. Cl.
*G06K 19/06* (2006.01)
*G06F 16/93* (2019.01)
*G06K 7/14* (2006.01)

(52) U.S. Cl.
CPC ....... *G06K 19/06037* (2013.01); *G06F 16/93* (2019.01); *G06K 19/06075* (2013.01); *G06K 19/06131* (2013.01); *G06K 7/1417* (2013.01)

(58) Field of Classification Search
CPC ....... G06K 19/06037; G06K 19/06131; G06K 19/06075; G06K 7/1417; G06F 16/93
See application file for complete search history.

(56) References Cited

U.S. PATENT DOCUMENTS

| | | | | |
|---|---|---|---|---|
| 5,986,651 A * | 11/1999 | Reber | ............... | B42D 15/008 715/738 |
| 7,273,175 B2 | 9/2007 | Zhao et al. | | |
| 9,111,186 B2 * | 8/2015 | Blasinski | ............ | G06K 19/0614 |
| 2006/0187708 A1 * | 8/2006 | Aoyagi | ................. | G11B 19/02 365/185.2 |
| 2007/0019222 A1 * | 1/2007 | Oda | ...................... | G06F 3/1204 358/1.13 |
| 2008/0308638 A1 | 12/2008 | Hussey | | |
| 2012/0131422 A1 * | 5/2012 | Shinbashi | ............. | H04L 1/0009 714/779 |
| 2012/0162682 A1 * | 6/2012 | Tomiyasu | ............. | G06F 3/1222 358/1.13 |
| 2012/0211567 A1 * | 8/2012 | Herzig | ................ | G06K 7/1093 235/488 |
| 2013/0026240 A1 | 1/2013 | Hagiwara et al. | | |

(Continued)

OTHER PUBLICATIONS

M. Topkara et al., "Enabling Multiple QR Codes in Close Proximity," IBM T.J. Watson Research Center, Yorktown Heights, NY, available at https://arxiv.org/abs/1510.08210 (Oct. 28, 2015), 8 pages.

*Primary Examiner* — Thien M Le
(74) *Attorney, Agent, or Firm* — Proskauer Rose LLP

(57) ABSTRACT

Methods and apparatuses are described for generating a quick response (QR) grid that represents electronic data associated with a digital document. A server captures electronic data associated with a digital document, the electronic data comprising a plurality of key-value pairs. The server determines a total size of the electronic data and partitions the electronic data into two or more portions. The server generates a map of QR codes based upon the two or more portions of electronic data, each QR code in the map comprising a header, a footer, and a payload containing one of the two or more portions of electronic data. The server creates a QR grid using the map of QR codes. The server prints a physical document that corresponds to the digital document, the physical document including the created QR grid.

24 Claims, 8 Drawing Sheets

(56) References Cited

U.S. PATENT DOCUMENTS

| | | | |
|---|---|---|---|
| 2013/0075296 A1* | 3/2013 | Ramsey | B41M 5/28 |
| | | | 206/459.5 |
| 2013/0246136 A1* | 9/2013 | Ramsey | G06Q 20/3276 |
| | | | 705/14.12 |
| 2013/0320078 A1* | 12/2013 | Hobbs | G06Q 10/10 |
| | | | 235/375 |
| 2017/0124442 A1 | 5/2017 | Nishizaki | |
| 2018/0046889 A1* | 2/2018 | Kapinos | G06F 16/93 |

* cited by examiner

US 10,366,315 B1

GENERATING A QUICK RESPONSE (QR) GRID ASSOCIATED WITH A DIGITAL DOCUMENT

TECHNICAL FIELD

This application relates generally to methods and apparatuses, including computer program products, for generating a quick response (QR) grid that represents electronic data associated with a digital document.

BACKGROUND

Quick response codes, also known as QR codes, are a type of matrix barcode used to store electronic data in an encoded format that is readable by scanners and other types of imaging devices. These scanners capture an image of the QR code, and process the image to extract and decode the data contained within. Generally, QR codes have improved storage capacity over more traditional types of barcodes, such as UPC codes. Typical QR codes can store up to 2,953 bytes of data—although this value can decrease depending on the amount of error correction desired. As such, a QR code is useful for storing a modest amount of data (e.g., a URL, bank account information, login credentials, and the like).

For electronic and/or physical documents that comprise multiple pages of data, however, it is not feasible to use a single QR code. In some methods, a QR code may be used for each page of data (or portions of pages). However, there are several drawbacks with these methods. First, each QR code is separate and independent; there is no effective way to tie the QR codes together as part of the same corpus of electronic data. Thus, when scanning the QR codes for reproduction of the data in the document, the system must interpret each QR code individually without being aware of any relationship to the other QR codes (e.g., sequence of data). In addition, a separate scan is required for each QR code—which is time-consuming and inefficient for documents that span a large number of pages.

SUMMARY

Therefore, what is needed are methods and systems for generating a quick response (QR) grid, comprised of multiple interrelated QR codes, that represents electronic data associated with a digital document, and which can be scanned and interpreted in a single scan. The techniques described herein provide the advantage of producing a grid of interrelated QR codes that can contain the entire corpus of data for a multiple-page digital and/or physical document. As a result, the methods and systems described herein beneficially overcome the data transmission limits imposed by traditional QR codes and enable the fast, efficient capture and transfer of document-related data for a wide range of computing applications.

The invention, in one aspect, features a system for generating a quick response (QR) grid that represents electronic data associated with a digital document. The system comprises a server computing device including a memory for storing programmatic instructions and a processor for executing the programmatic instructions. The processor of the server computing device executes the programmatic instructions to capture electronic data associated with a digital document, the electronic data comprising a plurality of key-value pairs. The processor of the server computing device executes the programmatic instructions to determine a total size of the electronic data and partition the electronic data into two or more portions, each portion of electronic data having a size less than the total size of the electronic data. The processor of the server computing device executes the programmatic instructions to generate a map of QR codes based upon the two or more portions of electronic data, each QR code in the map comprising a header, a footer, and a payload containing one of the two or more portions of electronic data. The processor of the server computing device executes the programmatic instructions to create a QR grid using the map of QR codes. The processor of the server computing device executes the programmatic instructions to print a physical document that corresponds to the digital document, the physical document including the created QR grid.

The invention, in another aspect, features a computerized method of generating a quick response (QR) grid that represents electronic data associated with a digital document. A server computing device captures electronic data associated with a digital document, the electronic data comprising a plurality of key-value pairs. The server computing device determines a total size of the electronic data and partition the electronic data into two or more portions, each portion of electronic data having a size less than the total size of the electronic data. The server computing device generates a map of QR codes based upon the two or more portions of electronic data, each QR code in the map comprising a header, a footer, and a payload containing one of the two or more portions of electronic data. The server computing device creates a QR grid using the map of QR codes. A printing device coupled to the server computing device prints a physical document that corresponds to the digital document, the physical document including the created QR grid.

Any of the above aspects can include one or more of the following features. In some embodiments, partitioning the electronic data into two or more portions further comprises generating an error correction value associated with each portion of electronic data; and inserting the error correction value into the corresponding portion of electronic data. In some embodiments, the error correction value is a Reed-Solomon error correction value.

In some embodiments, generating a map of QR codes based upon the two or more portions of electronic data comprises, for each portion of electronic data, generating a hash value for the portion of electronic data and appending the hash value to the portion of electronic data. The portions of electronic data are arranged into a sequence. A null value is prepended to the first portion of electronic data in the sequence. The hash value of the preceding portion of electronic data in the sequence is prepended to each portion of electronic data in the sequence other than the first portion of electronic data. Each portion of electronic data is encoded into a QR code, the header of the QR code comprises the prepended null value or the prepended hash value, the footer of the QR code comprising the appended hash value, and the payload comprising the portion of electronic data. A map of the QR codes is created, the map comprising the header and footer of each QR code ordered based upon the sequence. In some embodiments, the sequence of portions of electronic data matches a sequence of the electronic data in the digital document.

In some embodiments, creating a QR grid using the map of QR codes comprises arranging the QR codes into a grid pattern using the map of QR codes, where the QR code having a null value in the header is positioned in a top-left corner of the grid pattern.

In some embodiments, the server computing device scans, using an image capture device coupled to the server computing device, the QR grid on the physical document. The server computing device splits the QR grid into a plurality of QR codes using one or more visual landmarks of the QR grid. The server computing device arranges the plurality of QR codes using the mapped sequence. The server computing device extracts the payload of each QR code and decodes the extracted payload into the corresponding portion of electronic data. The server computing device generates an electronic file comprising each portion of electronic data extracted from the QR codes.

In some embodiments, the image capture device scans all of the QR codes in the QR grid in a single scan. In some embodiments, splitting the QR grid into a plurality of QR codes using one or more visual landmarks of the QR grid comprises determining a version identifier for one or more of the plurality of QR codes in the QR grid; identifying the one or more visual landmarks associated with one or more of the plurality of QR codes in the QR grid based upon the version identifier; and extracting each QR code from the QR grid based upon the one or more visual landmarks. In some embodiments, the one or more visual landmarks comprise finder cubes. In some embodiments, the one or more visual landmarks are identified using x-y coordinates associated with the version identifier. In some embodiments, the electronic file is a JSON file.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
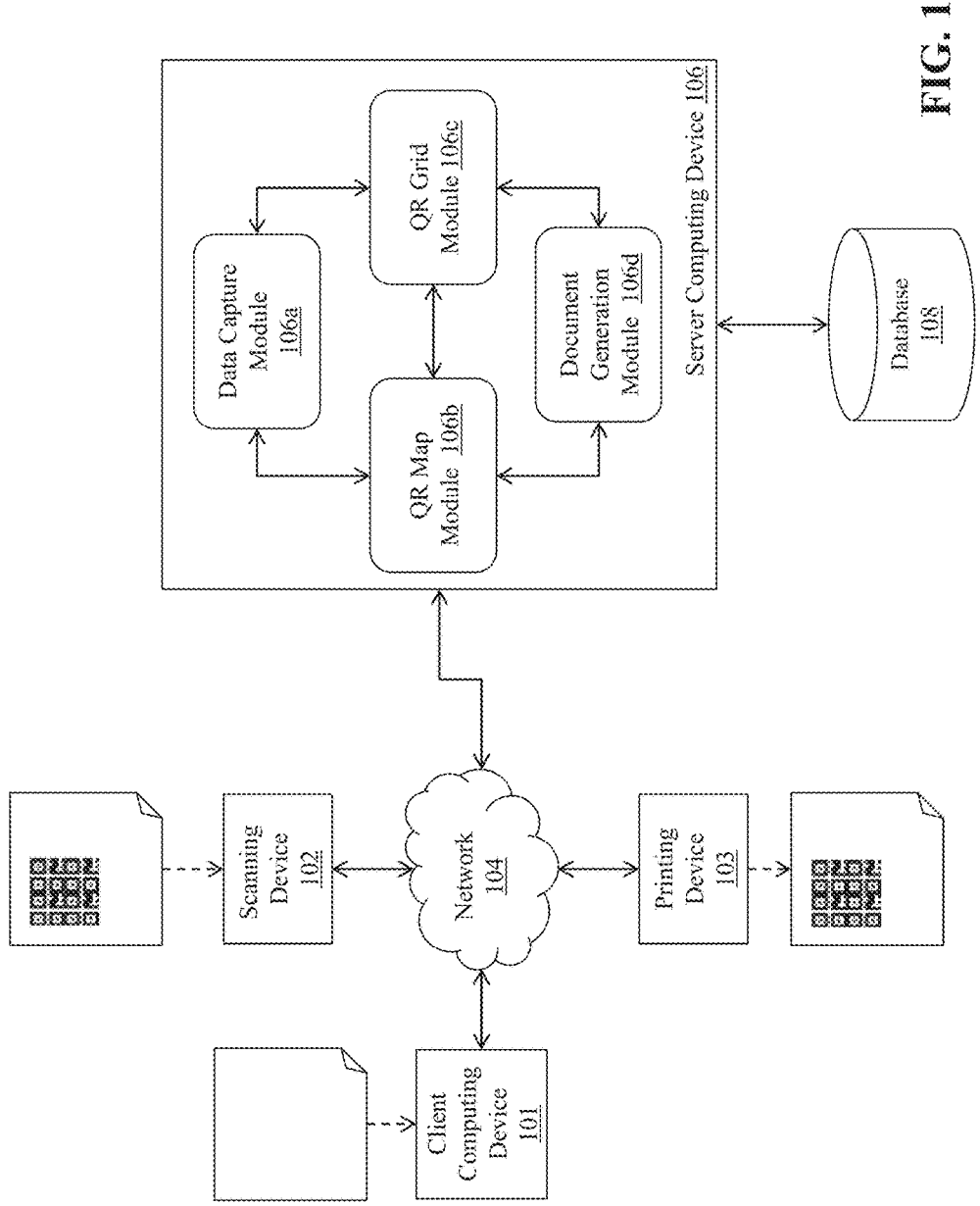
FIG. 1 is a block diagram of a system for generating a quick response (QR) grid that represents electronic data associated with a digital document.

FIG. 1 is a block diagram of a system 100 for generating a quick response (QR) grid that represents electronic data associated with a digital document. The system 100 includes a client computing device 101, a scanning device 102, and a printing device 103 that are each coupled via communications network 104 to a server computing device 106. The server computing device 106 includes a data capture module 106a, a QR map module 106b, a QR grid module 106c, and a document generation module 106d. The server computing device 106 is coupled to a database 108.

Exemplary client computing devices 102 include, but are not limited to, tablets, smartphones, laptops, desktops, and other computing devices. It should be appreciated that other types of client computing devices that are capable of connecting to the components of the system 100 can be used without departing from the scope of invention. Although FIG. 1 depicts a single client computing device 102, it should be appreciated that the system 100 can include any number of client computing devices.

The client computing device 102 can execute software applications, such as browser applications. In some embodiments, a browser application comprises software executing on a processor of the client computing device 102 that enables the device to communicate via HTTP or HTTPS with remote servers addressable with URLs (e.g., server computing device 106) to receive content, including one or more webpages, for rendering in the browser application and presentation on a display device embedded in or coupled to the client computing device 102. Exemplary mobile browser application software includes, but is not limited to, Firefox™ Chrome™, Safari™, and other similar software. The one or more webpages can comprise visual and audio content for display to and interaction with a user, that contain data relating to the process of generating a quick response (QR) grid that represents electronic data associated with a digital document as described herein.

The scanning device 102 includes hardware and software components that capture and process a QR grid associated with a document. Exemplary scanning devices include, but are not limited to, digital cameras (either standalone or embedded in a computing device), optical scanners (e.g., QR/barcode readers) and the like. It should be appreciated that the scanning device 102 can be configured to capture a QR grid from a physical document (e.g., by scanning or capturing an image of the QR grid printed on a paper document) or a QR grid from a digital document (e.g., by receiving or capturing a digital image of the QR grid associated with the digital document). Exemplary file formats for a digital document include, but are not limited to .PDF, .TIFF, .JPG, .GIF, .DOC, and the like. In some embodiments, the scanning device 102 can capture the QR grid from a physical document in any of the previously-mentioned digital file formats or convert a captured image file into another format (e.g., .PDF). Although FIG. 1 shows the scanning device 102 coupled to the network 104, it should be appreciated that the scanning device 102 can alternatively be coupled to the client computing device 101 or the server computing device 106 (e.g., via cable).

The printing device 102 includes hardware and software components that produce a physical copy of a digital document that includes a QR grid. Exemplary printing devices include, but are not limited to, inkjet and laser printers. Although FIG. 1 shows the printing device 103 coupled to the network 104, it should be appreciated that the printing device 103 can alternatively be coupled to the client computing device 101 or the server computing device 106 (e.g., via cable).

The communications network 104 enables the other components of the system 100 to communicate with each other in order to perform the process of generating a quick response (QR) grid that represents electronic data associated with a digital document as described herein. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The server computing device 106 is a combination of hardware, including one or more special-purpose processors and one or more physical memory modules, and specialized software modules—such as modules 106a-106d—that execute on the processor of the server computing device 106, to receive data from other components of the system 100, transmit data to other components of the system 100, and perform functions for generating a quick response (QR) grid that represents electronic data associated with a digital document as described herein.

In some embodiments, the modules 106a-106d are specialized sets of computer software instructions programmed onto a dedicated processor in the server computing device 106 and can include specifically-designated memory locations and/or registers for executing the specialized computer software instructions. Further explanation of the specific processing performed by the modules 106a-106d will be provided below.

The database 108 comprises transient and/or persistent memory for data storage that is used in conjunction with the process of generating a quick response (QR) grid that represents electronic data associated with a digital document described herein. Generally, the database 108 is configured to receive, generate, and store specific segments of data relating to the process of generating a quick response (QR) grid that represents electronic data associated with a digital document. In some embodiments, all or a portion of the database 108 can be integrated within the server computing device 106 or be located on a separate computing device or devices. For example, the database 108 can comprise a database such as MySQL™ available from Oracle Corp. of Redwood City, Calif.

Figure 2:
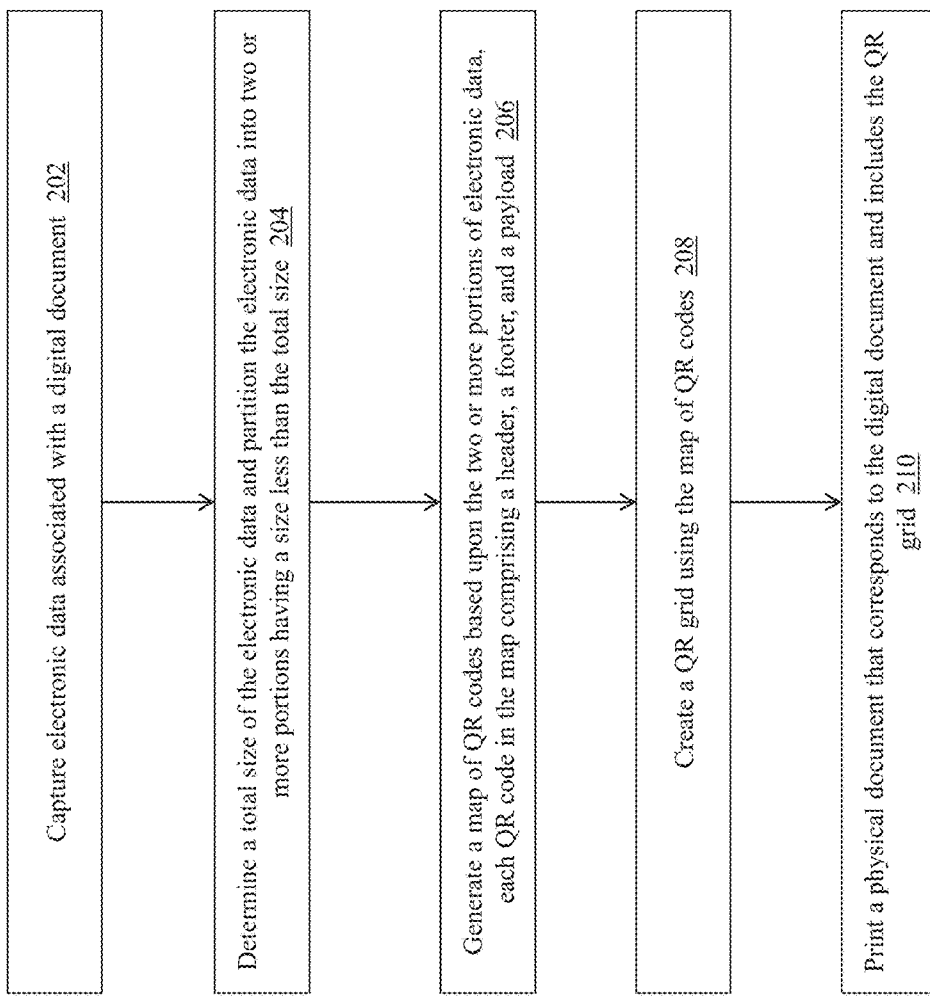
FIG. 2 is a flow diagram of a computerized method of generating a quick response (QR) grid that represents electronic data associated with a digital document.

FIG. 2 is a flow diagram of a computerized method 200 of generating a quick response (QR) grid that represents electronic data associated with a digital document, using the system 100 of FIG. 1. The data capture module 106a of the server computing device 106 captures (202) electronic data associated with a digital document. In one example, a user at client computing device 101 can enter data into a digital document (e.g., a .PDF file) and transmit the digital document to the data capture module 106a. In another example, a user can submit a digital image of a physical document that is transmitted to the data capture module 106a, which can perform computer analysis techniques such as Optical Character Recognition (OCR) on the digital image to capture the data contained within. It should be appreciated that although FIG. 1 depicts the data capture module 106a as part of the server computing device 106, in some embodiments the functionality of the data capture module 106a is located on the client computing device 101 and/or the scanning device 102.

In some embodiments, the digital document comprises a plurality of form fields that each includes a label and an input area. The label can be a descriptor that indicates what type of data is stored in the form field. The input area is a blank, fillable area where the user can provide electronic data corresponding to the associated label. For example, a form field may have the label "First Name," and the user can provide his or her first name as text input to the input area. As a result, each form field in the digital document can be represented as a key-value pair, where the key is the label and the value is the associated input (i.e., <"First Name">-<first name input> or ["First Name"]:[first name input]. It should be appreciated that other types of data structures can be used or included in the digital document without departing from the scope of invention.

The data capture module 106a of the server computing device 106 determines (204) a total size of the electronic data captured from the digital document, and partitions the electronic data into two or more portions. In one embodiment, the data capture module 106a can determine the total size of the electronic data (i.e., the complete set of key-value pairs) extracted from the digital document in bytes. As mentioned previously, typical single QR codes can store up to 2,953 bytes of data, with 32 bytes allotted to the header (16 bytes) and footer (16 bytes). In the case where the total size of the electronic data exceeds the size in bytes of a typical single QR code, the data capture module 106a partitions the electronic data into two or more portions where each portion has a data size that is less than or equal to the size in bytes of a typical single QR code. For example, the total size of electronic data may be 11,812 bytes (or 2,953 bytes×4). Therefore, the data capture module 106a can partition the electronic data into four portions of 2,953 bytes each. It should be appreciated that in some embodiments, the portions of data need not be an equal size to each other, as long as each portion does not exceed the size of a typical single QR code. Also, in some embodiments, the data capture module 106a partitions the electronic data so that the integrity of each key-value pair is maintained—meaning that no key-value pair is broken up across different portions of electronic data.

In some embodiments, the data capture module 106a can include error correction data (e.g., a Reed-Solomon error correction code) as part of one or more of the partitions of electronic data. Error correction data can be incorporated into QR codes to restore data if the QR code becomes damaged or partially unreadable. Error correction can be applied in a number of different levels, from Low (L) to High (H). At this stage, the data capture module 106a can simply indicate a desired level of error correction to be applied when the QR code is created, or in some embodiments, the data capture module 106a can generate the error correction codes to be included into the generated QR code.

Figure 3:
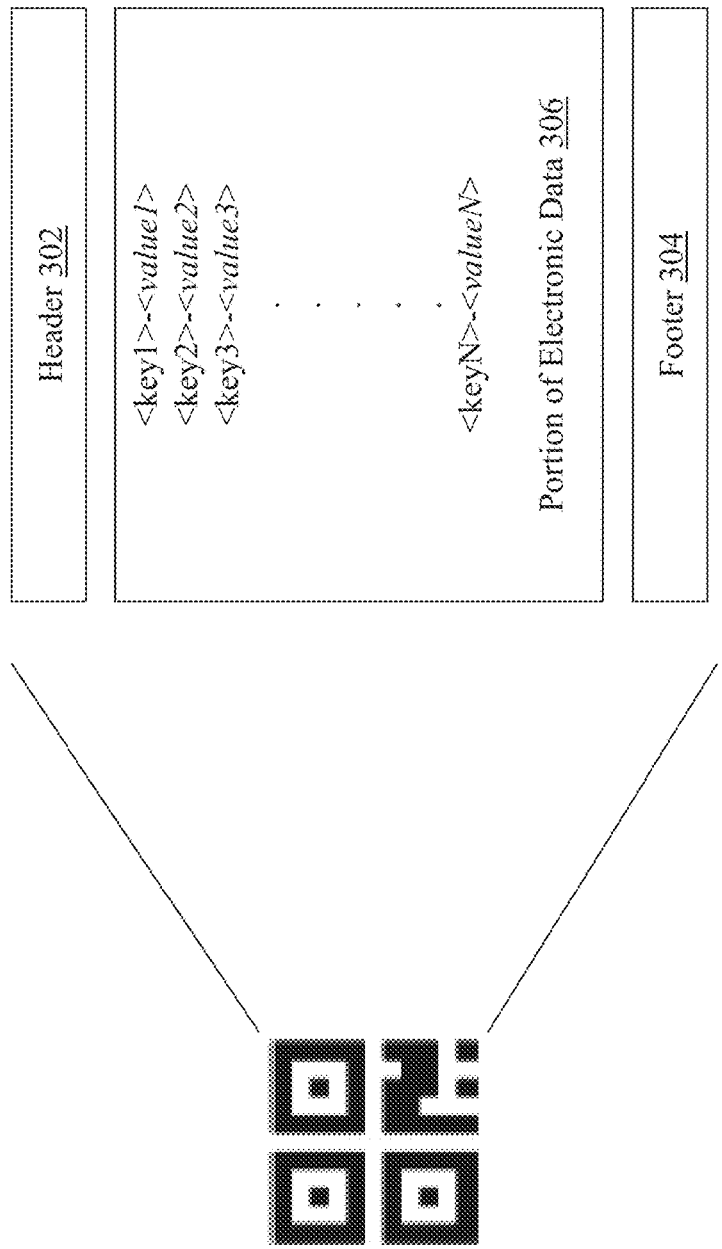
FIG. 3 is a diagram of the data format of the QR codes generated by the QR map module.

After the electronic data is partitioned as described above, the QR map module 106b of the server computing device 106 generates (206) a map of QR codes based upon the two or more portions of electronic data. In this step, the QR map module 106b encodes each portion of electronic data into a corresponding QR code (including any desired error correction). Generally, the QR map module 106b uses a binary (or byte) encoding method (e.g., as defined in ISO/IEC 18004: 2015, "Information technology—Automatic identification and data capture techniques—QR Code bar code symbology specification") to encode the electronic data. In addition, each QR code created by the QR map module 106b comprises a header, a footer, and a payload. An exemplary diagram of the data format of the QR codes generated by the QR map module 106b is shown in FIG. 3. The header 302 and the footer 304 typically include either a hash value corresponding to the payload of another QR code (which in turn comprise the map of QR codes), and the payload 306 typically includes the portion of electronic data (i.e., the key-value pairs). In this way, the header and the footer serve to link the QR codes together into an ordered sequence (as provided in detail below). In some embodiments, the header 302 is a 16-bit hash code based upon the payload of a prior QR code while the footer 304 is a 16-bit hash code based upon the payload of the present QR code. As will be described below, in some embodiments the header 302 of a QR code can be a null value.

Figure 4:
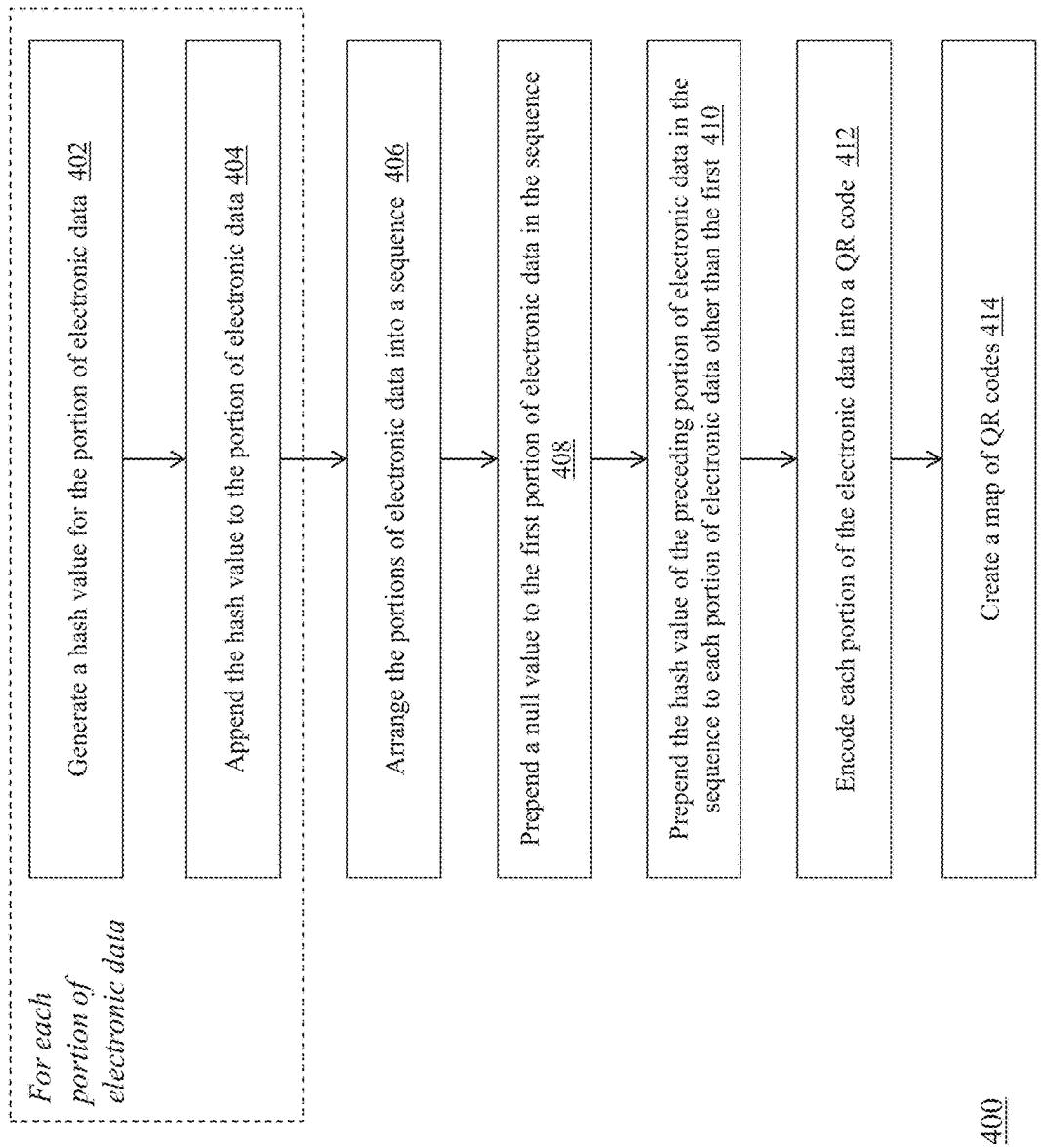
FIG. 4 is a detailed flow diagram of a method of generating a map of QR codes based upon the two or more portions of electronic data.

FIG. 4 is a detailed flow diagram of a method 400 of generating a map of QR codes based upon the two or more portions of electronic data, as performed by the QR map module 106b. For each portion of electronic data, the QR map module 106b generates (402) a hash value for the portion of electronic data as set forth above. It should be appreciated that any of a number of different hash functions or hash algorithms can be used by the QR map module 106b. The QR map module 106b appends (404) the hash value to the portion of electronic data, and then arranges (406) the portions of electronic data into a sequence. In one embodiment, the sequence of portions of electronic data corresponds to an order of the electronic data in the underlying digital document.

The QR map module 106b prepends (408) a null value to the first portion of electronic data in the sequence. Because the first QR code cannot link back to a prior QR code in the sequence, its header value is set to null. The module 106b then prepends (410) the hash value of the preceding portion of electronic data in the sequence to each portion of electronic data other than the first portion of electronic data in the sequence. The module 106b encodes (412) each portion of electronic data in the sequence into a QR code, the header of the QR code comprising the prepended null value or the prepended hash value, the footer of the QR code comprising the appended hash value, and the payload comprising the portion of electronic data. In this way, a map of the QR codes is created (414) comprising the header and footer of each QR code ordered based upon the sequence. Conceptually, the map of QR codes can be considered similar to a linked list, where there is a starting data item and an ending data item that are linked to a plurality of other data items in an ordered sequence. The map, which comprises the header and footer information for each QR code in the sequence, can be stored in, e.g., database 108.

Figure 5:
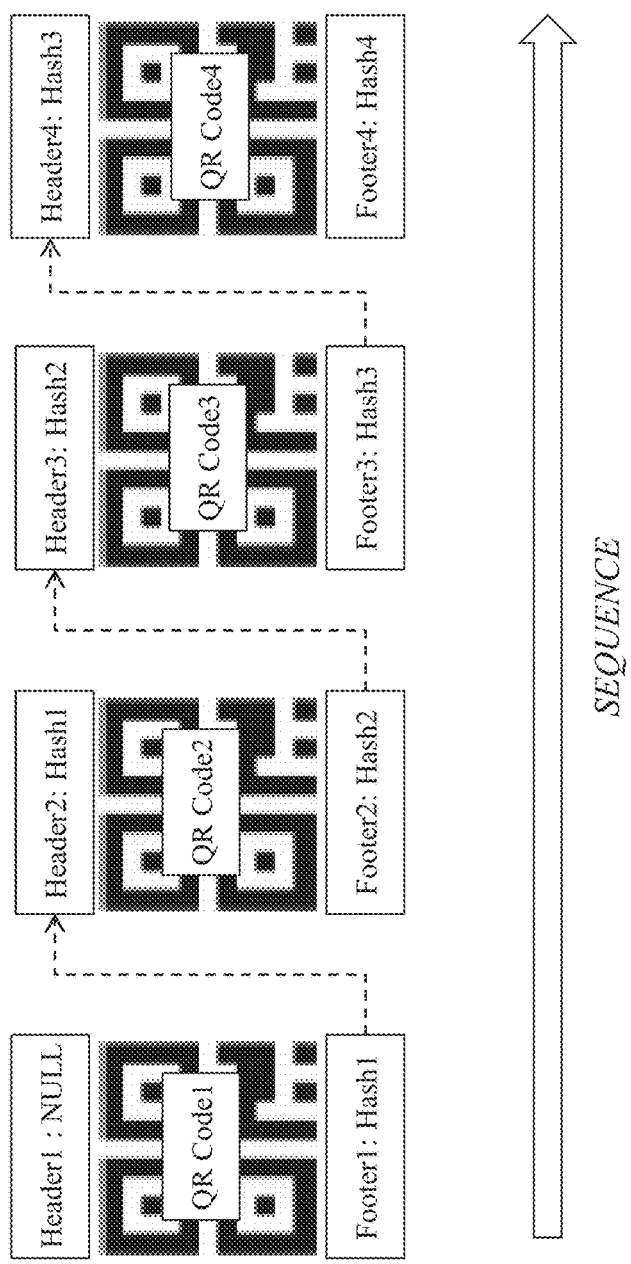
FIG. 5 is a diagram showing the map of QR codes created by the QR map module.

FIG. 5 is an exemplary diagram showing the map of QR codes created by the QR map module 106b as a result of steps 402-414. As shown in FIG. 5, the QR codes are arranged in an ordered sequence and the codes are linked together using the header/footer values.

Figure 6:
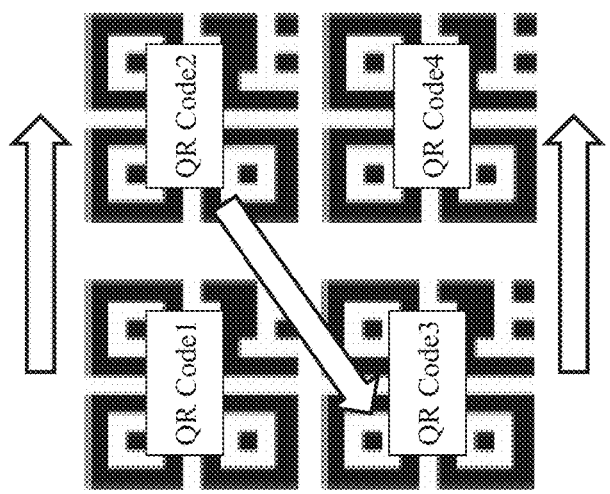
FIG. 6 is a diagram showing a grid of QR codes generated by the QR grid module.

Turning back to FIG. 2, once the QR map is created, the QR grid module 106c creates (208) a QR grid using the map of QR codes. Because the map defines the sequence of QR codes, the QR grid module 106c can arrange the QR codes in a grid pattern using the map data. In one embodiment, the QR grid module 106c generates a multidimensional grid of QR codes based upon a count of QR codes in the map. For example, if the map comprises four QR codes, the QR grid module 106c can create a 2×2 grid—placing the first QR code in the map in the top-left corner of the grid. FIG. 6 is an exemplary diagram showing a grid of QR codes generated by the QR grid module 106c. As shown in FIG. 6, QR Code 1 is in the top left corner, QR Code 2 is in the top right corner, QR Code 3 is in the bottom left corner, and QR Code 4 is in the bottom right corner.

After creation of the QR grid, the document generation module 106d associates the QR grid with the digital document and transmits instructions to the printing device 103 to print (210) a physical document that corresponds to the digital document and includes the QR grid. In some embodiments, the printing device 103 prints a physical copy of the digital document with the QR grid in a corner of, e.g., the first page—which enables a subsequent, single scan of the QR grid to decode all of the QR codes in the grid and reproduce the underlying electronic data, as explained in greater detail below.

Figure 7:
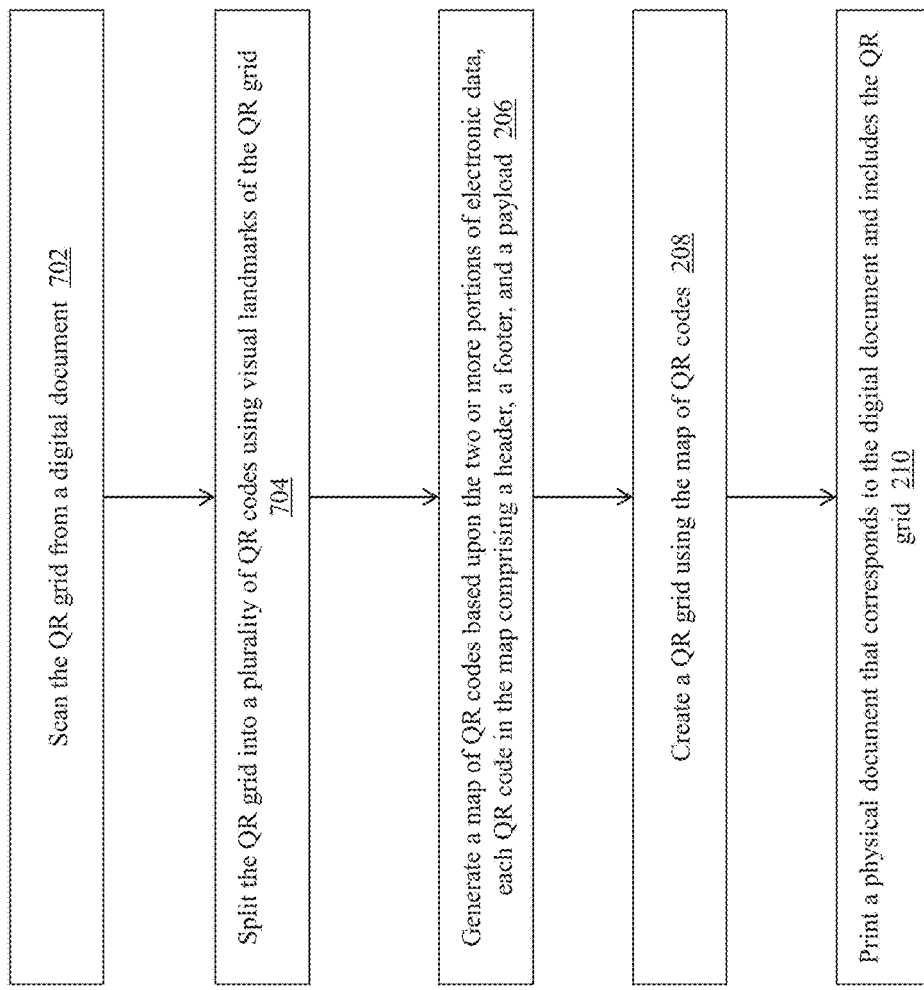
FIG. 7 is a flow diagram of a method of scanning a QR grid that represents electronic data associated with a digital document.

FIG. 7 is a flow diagram of a method 700 of scanning a QR grid that represents electronic data associated with a digital document, using the system 100 of FIG. 1. The scanning device 102 scans (702) the QR grid from a physical document (e.g., by scanning or capturing an image of the QR grid printed on a paper document) or from a QR grid from a digital document (e.g., by receiving or capturing a digital image of the QR grid associated with the digital document) and transmits the scanned QR grid to the server computing device 106. As mentioned above, the scanning device 102 advantageously performs just one scan that captures all of the QR codes in the grid—instead of having to separately scan each QR code in the grid.

Figure 8:
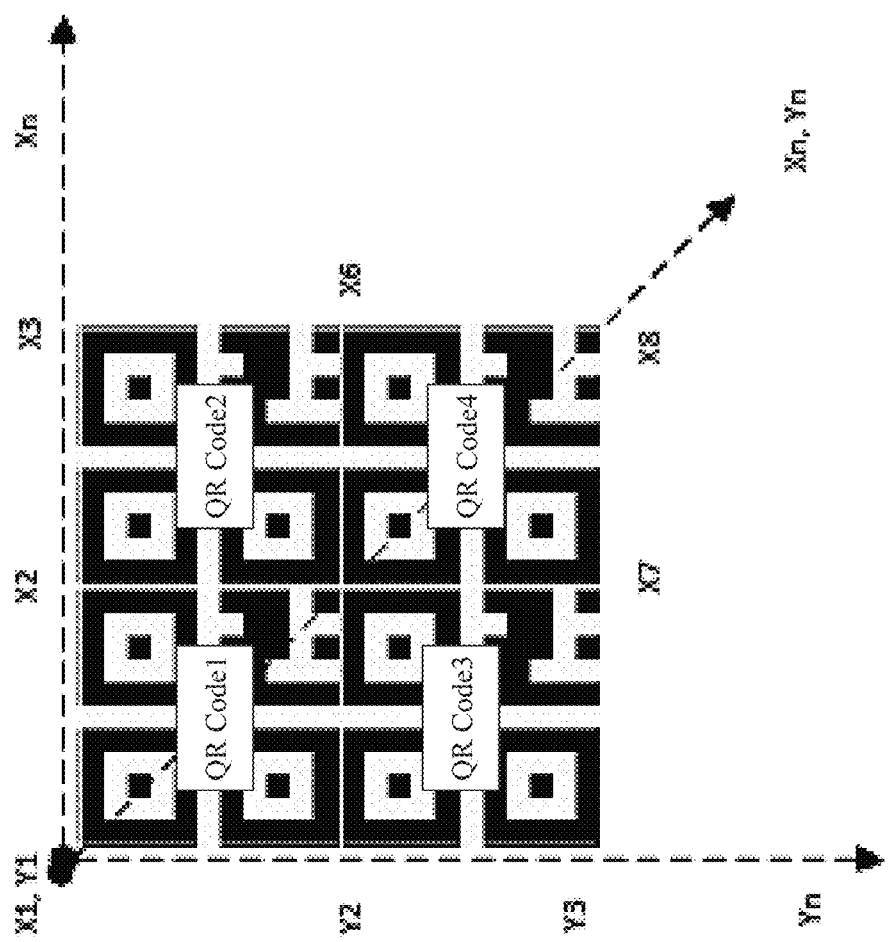
FIG. 8 is a diagram of how the QR grid module 106c uses x-y coordinates to locate individual QR codes in a QR grid.

The QR grid module 106c splits (704) the QR grid into a plurality of QR codes using one or more visual landmarks of the QR grid. In one embodiment, the QR grid includes visual landmarks, such as finder cubes, that enable the QR grid module 106c to identify the location of individual QR codes within the QR grid. In another embodiment, the QR grid module 106c determines a version identifier for one or more of the plurality of QR codes in the QR grid based upon the information encoded in the grid, and identifies the one or more visual landmarks associated with one or more of the plurality of QR codes in the QR grid based upon the version identifier. For example, the version identifier may be associated with particular x-y coordinates of the QR grid where one or more of the QR codes is positioned. FIG. 8 is an exemplary diagram of how the QR grid module 106c uses x-y coordinates to locate individual QR codes in a QR grid.

The QR grid module 106c arranges (706) the plurality of QR codes using the map. As described above, the QR grid is associated with a map of QR codes that is comprised of the header and footer information in an ordered sequence. The QR grid module 106c can, e.g., retrieve the map information from database 108 and arrange the individual QR codes according to the sequence defined in the map (as shown in FIG. 5).

The QR grid module 106c extracts (708) the payload of each QR code and decodes the extracted payload into the corresponding portion of electronic data (using, e.g., decoding techniques defined in ISO/IEC 18004:2015, "Information technology—Automatic identification and data capture techniques—QR Code bar code symbology specification"). The QR grid module 106c generates (710) an electronic file (e.g., a JSON file) comprising each portion of electronic data extracted from the QR codes. For example, the electronic file can comprise all of the key-value pairs in the electronic data, ordered in the same sequence as set forth in the digital document. In this way, the system 100 quickly and efficiently recreates all of the key-value pairs of electronic data stored in the digital document with a single scan of the QR grid.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for generating a quick response (QR) grid that represents electronic data associated with a digital document, the system comprising:
a server computing device including a memory for storing programmatic instructions and a processor for executing the programmatic instructions,
the processor of the server computing device executing the programmatic instructions to:
capture electronic data associated with the digital document, the electronic data comprising a plurality of key-value pairs;
determine a total size of the electronic data and partition the electronic data into two or more portions, each portion of electronic data having a size less than the total size of the electronic data;
generate a map of QR codes based upon the two or more portions of electronic data, each QR code in the map comprising a header, a footer, and a payload containing one of the two or more portions of electronic data;
create a QR grid using the map of QR codes; and
print a physical document that corresponds to the digital document, the physical document including the created QR grid.

2. The system of claim 1, wherein partitioning the electronic data into two or more portions further comprises:
generating an error correction value associated with each portion of electronic data; and
inserting the error correction value into the corresponding portion of electronic data.

3. The system of claim 2, wherein the error correction value is a Reed-Solomon error correction value.

4. The system of claim 1, wherein generating a map of QR codes based upon the two or more portions of electronic data comprises:
for each portion of electronic data:
generating a hash value for the portion of electronic data;
appending the hash value to the portion of electronic data;
arranging the portions of electronic data into a sequence;
prepending a null value to the first portion of electronic data in the sequence;
prepending, to each portion of electronic data in the sequence other than the first portion of electronic data, the hash value of the preceding portion of electronic data in the sequence;
encode each portion of electronic data into a QR code, the header of the QR code comprising the prepended null value or the prepended hash value, the footer of the QR code comprising the appended hash value, and the payload comprising the portion of electronic data; and
creating a map of the QR codes comprising the header and footer of each QR code ordered based upon the sequence.

5. The system of claim 4, wherein the sequence of portions of electronic data matches a sequence of the electronic data in the digital document.

6. The system of claim 1, wherein creating a QR grid using the map of QR codes comprises:
arranging the QR codes into a grid pattern using the map of QR codes,
wherein the QR code having a null value in the header is positioned in a top-left corner of the grid pattern.

7. The system of claim 1, wherein the processor of the server computing device executes further programmatic instructions to:
scan, using an image capture device coupled to the server computing device, the created QR grid on the physical document;
split the created QR grid into a plurality of QR codes using one or more visual landmarks of the created QR grid;
arrange the plurality of QR codes using the mapped sequence;
extract the payload of each QR code and decode the extracted payload into the corresponding portion of electronic data; and
generate an electronic file comprising each portion of electronic data extracted from the QR codes.

8. The system of claim 7, wherein the image capture device scans all of the QR codes in the QR grid in a single scan.

9. The system of claim 7, wherein splitting the created QR grid into a plurality of QR codes using the one or more visual landmarks of the QR grid comprises:
determining a version identifier for one or more of the plurality of QR codes in the created QR grid;
identifying the one or more visual landmarks associated with one or more of the plurality of QR codes in the created QR grid based upon the version identifier; and
extracting each QR code from the created QR grid based upon the one or more visual landmarks.

10. The system of claim 9, wherein the one or more visual landmarks comprise finder cubes.

11. The system of claim 9, wherein the one or more visual landmarks are identified using x-y coordinates associated with the version identifier.

12. The system of claim 7, wherein the electronic file is a JSON file.

13. A computerized method of generating a quick response (QR) grid that represents electronic data associated with a digital document, the method comprising:
capturing, by a server computing device, electronic data associated with a digital document, the electronic data comprising a plurality of key-value pairs;
determining, by the server computing device, a total size of the electronic data and partitioning the electronic data into two or more portions, each portion of electronic data having a size less than the total size of the electronic data;
generating, by the server computing device, a map of QR codes based upon the two or more portions of electronic data, each QR code in the map comprising a header, a footer, and a payload containing one of the two or more portions of electronic data;
creating, by the server computing device, a QR grid using the map of QR codes; and
printing, by a printing device coupled to the server computing device, a physical document that corresponds to the digital document, the physical document including the created QR grid.

14. The method of claim 13, wherein partitioning the electronic data into two or more portions further comprises:
generating an error correction value associated with each portion of electronic data; and inserting the error correction value into the corresponding portion of electronic data.

15. The method of claim 14, wherein the error correction value is a Reed-Solomon error correction value.

16. The method of claim 13, wherein generating a map of QR codes based upon the two or more portions of electronic data comprises:
for each portion of electronic data:
generating a hash value for the portion of electronic data;
appending the hash value to the portion of electronic data;
arranging the portions of electronic data into a sequence;
prepending a null value to the first portion of electronic data in the sequence;
prepending, to each portion of electronic data in the sequence other than the first portion of electronic data, the hash value of the preceding portion of electronic data in the sequence;
encode each portion of electronic data into a QR code, the header of the QR code comprising the prepended null value or the prepended hash value, the footer of the QR code comprising the appended hash value, and the payload comprising the portion of electronic data; and
creating a map of the QR codes comprising the header and footer of each QR code ordered based upon the sequence.

17. The method of claim 16, wherein the sequence of portions of electronic data matches a sequence of the electronic data in the digital document.

18. The method of claim 13, wherein creating a QR grid using the map of QR codes comprises:
arranging the QR codes into a grid pattern using the map of QR codes,
wherein the QR code having a null value in the header is positioned in a top-left corner of the grid pattern.

19. The method of claim 13, further comprising:
scanning, using an image capture device coupled to the server computing device, the QR grid on the physical document;
splitting, by the server computing device, the QR grid into a plurality of QR codes using one or more visual landmarks of the QR grid;
arranging, by the server computing device, the plurality of QR codes using the mapped sequence;
extracting, by the server computing device, the payload of each QR code and decode the extracted payload into the corresponding portion of electronic data; and
generate an electronic file comprising each portion of electronic data extracted from the QR codes.

20. The method of claim 19, wherein the image capture device scans all of the QR codes in the QR grid in a single scan.

21. The method of claim 19, wherein splitting the QR grid into a plurality of QR codes using the one or more visual landmarks of the QR grid comprises:
determining a version identifier for one or more of the plurality of QR codes in the QR grid;
identifying the one or more visual landmarks associated with one or more of the plurality of QR codes in the QR grid based upon the version identifier; and
extracting each QR code from the QR grid based upon the one or more visual landmarks.

22. The method of claim 21, wherein the one or more visual landmarks comprise finder cubes.

23. The method of claim 21, wherein the one or more visual landmarks are identified using x-y coordinates associated with the version identifier.

24. The method of claim 19, wherein the electronic file is a JSON file.

* * * * *